United States Patent
Jeong

(10) Patent No.: US 11,198,474 B2
(45) Date of Patent: Dec. 14, 2021

(54) FRONT VEHICLE BODY REINFORCING STRUCTURE

(71) Applicants: Hyundai Motor Company, Seoul (KR); Kia Motors Corporation, Seoul (KR)

(72) Inventor: Seung Min Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 31 days.

(21) Appl. No.: 16/871,795

(22) Filed: May 11, 2020

(65) Prior Publication Data

US 2021/0179178 A1   Jun. 17, 2021

(30) Foreign Application Priority Data

Dec. 13, 2019   (KR) .......................... 10-2019-0166896

(51) Int. Cl.
| | |
|---|---|
| *B62D 21/15* | (2006.01) |
| *B62D 21/03* | (2006.01) |
| *B62D 27/06* | (2006.01) |
| *B62D 25/04* | (2006.01) |
| *B62D 21/08* | (2006.01) |

(52) U.S. Cl.
CPC .......... *B62D 21/155* (2013.01); *B62D 21/03* (2013.01); *B62D 21/08* (2013.01); *B62D 25/04* (2013.01); *B62D 27/06* (2013.01)

(58) Field of Classification Search
CPC ...... B62D 21/155; B62D 21/03; B62D 27/06; B62D 25/04; B62D 21/08; B62D 25/082; B62D 25/02; B62D 21/152; F16B 5/02
USPC ..................................................... 296/187.09
See application file for complete search history.

(56) References Cited

U.S. PATENT DOCUMENTS

| | | | | |
|---|---|---|---|---|
| 4,626,011 A | * | 12/1986 | Gauthier ................. | B60R 19/44 293/120 |
| 8,454,080 B2 | * | 6/2013 | Qu .......................... | B60R 19/34 296/187.1 |
| 10,118,647 B2 | * | 11/2018 | Yoshida ................. | B62D 21/15 |
| 10,730,461 B2 | * | 8/2020 | Yoshida ............... | B62D 21/152 |
| 2020/0353993 A1 | * | 11/2020 | Yoshida .................. | B60R 19/02 |

FOREIGN PATENT DOCUMENTS

JP          2014196008 A      10/2014

\* cited by examiner

*Primary Examiner* — Pinel E Romain
(74) *Attorney, Agent, or Firm* — Mintz Levin Cohn Ferris Glovsky and Popeo, P.C.; Peter F. Corless

(57) ABSTRACT

A front vehicle body reinforcing structure is provided to improve front collision response performance of a vehicle. The front vehicle body reinforcing structure includes a front side member that is disposed on each of left and right sides of a front vehicle body to extend in a front-rear direction of a vehicle body. A crossbar is installed to connect between the front side members on the left and right sides and has a form bent in a bow shape. Additionally, support brackets are installed to connect between left and right side portions of the crossbar and the front side members to support the crossbar at each of the front side members.

14 Claims, 7 Drawing Sheets

[ CROSS SECTION TAKEN ALONG LINE A-A ]

FRONT VEHICLE BODY REINFORCING STRUCTURE

CROSS-REFERENCE TO RELATED APPLICATION

This application claims under 35 U.S.C. § 119(a) the benefit of priority to Korean Patent Application No. 10-2019-0166896 filed on Dec. 13, 2019, the entire contents of which are incorporated herein by reference.

BACKGROUND

(a) Technical Field

The present disclosure relates to a front vehicle body reinforcing structure, and more particularly, to a front vehicle body reinforcing structure capable of improving front collision response performance of a vehicle.

(b) Background Art

Generally, a front vehicle body of a vehicle is a frame structure which is disposed on a front side of a vehicle to form an engine room and includes a front-end module which forms a front side of the engine room and in which a cooling module, a headlamp, and the like are installed, a fender apron member which forms left and right side portions of the engine room and provides a space in which wheels are installed, and a dash panel disposed behind the engine room and configured to partition a passenger room and the engine room.

Further, a front side member is disposed below the engine room on left and right sides thereof to extend in a front-rear length direction of the vehicle to reinforce structural rigidity of the front vehicle body, and a sub-frame is disposed below the front side member to install and support an engine, a transmission, a suspension, and the like which are installed in the engine room.

A bumper beam, which is disposed to extend to be long in a width direction of the vehicle body (i.e., a left-right lateral direction of the vehicle body) to improve front collision response performance of the vehicle, is installed in a front end portion of the front side member. In particular, the bumper beam is connected to the front end portion of the front side member in a state in which a crash box interposed between the bumper beam and the front end portion thereof.

When a vehicle having the front vehicle body of the above-described structure collides forward with a collision object such as an obstacle or another vehicle while driving in an overlap, that is, when a collision object such as an overlap barrier collides with an outer side of the vehicle body by being biased to one side in a width direction of the vehicle, the collision object may collide with an outer portion of the vehicle body having relatively low rigidity by avoiding the front side member. Consequently, since a front overlap collision of the vehicle (e.g., a minimal impact collision) is not effectively responded to, a passenger may be safely protected and excessive collision damage to the vehicle may occur.

Accordingly, techniques to respond to an overlap collision (e.g. a minimal collision) by reinforcing the outer portion of the vehicle body have been proposed. For example, a structure in which a front end portion of a front fender apron member extends to a front end portion of a front side member and the front fender apron member is connected to the front side member by a connecting member, or a structure in which a reinforcing member for prevent an intrusion of a collision object is installed outside the front side member has been proposed. However, front overlap collision response performance is not effective.

Further, a structure for protecting a passenger room or compartment by excessively reinforcing an inner panel of a front pillar and a side sealing during small overlap has been developed. Although such a structure is excessive in terms of weight, it is possible to achieve target performance in the event of collision based on a current collision evaluation criterion of insurance institute for highway safety (IIHS). However, there is a need for an improved vehicle body reinforcing structure capable of protecting a passenger more safely without excessively increasing weight of a vehicle body.

Additionally, in the case of an electric vehicle, since an increase in weight of a vehicle is inevitable due to application of a large capacity high voltage battery, and it is difficult for the conventional response method to induce a behavior in an avoidance direction, it is necessary to improve a vehicle body reinforcing structure. An engine room is located in a front portion of a general vehicle, and powertrain such as an engine, a transmission, and the like is installed in the engine room.

Recently, instead of an internal combustion engine vehicle in which the conventional powertrain such as an engine, a transmission, and the like is installed in an engine room, the use of an electric vehicle equipped with a battery on a vehicle body floor and providing a loading space in a front side of a vehicle body is expanding.

In a long-distance electric vehicle, the presence of engine room or a PE room in which the powertrain is installed is used as a space capable of loading goods. This loading space is a front trunk at a front side of a vehicle body and is referred to as a frunk. Therefore, there is a need for improvement of vehicle body reinforcing structure capable of being applied to a vehicle having a frunk in a front side of a vehicle body.

SUMMARY

The present disclosure provides a front vehicle body reinforcing structure capable of effectively improving front collision response performance of a vehicle. In particular, the present disclosure provides a front vehicle body reinforcing structure capable of effectively improving front collision response performance of an electric vehicle having a frunk. Further, in another aspect, the present disclosure provides a front vehicle body reinforcing structure capable of inducing an avoidance behavior of a vehicle to reduce passenger injury and damage to a vehicle and a battery in the event of a small overlap collision in a long-distance electric vehicle.

In an exemplary embodiment, the present disclosure provides a front vehicle body reinforcing structure that may include a front side member disposed on each of left and right sides of a front vehicle body to extend in a front-rear direction of a vehicle body, a crossbar installed to connect between the front side members on the left and right sides and having a shape bent in a bow shape, and support brackets installed to connect between left and right side portions of the crossbar and the front side members to support the crossbar at each of the front side members.

Particularly, the crossbar may have a closed cross-sectional shape. Further, each of the support brackets may have a closed cross-sectional shape. The crossbar may have a shape which is bent forward or backward based on the front-rear direction of the vehicle body. Two portions on left and right sides of the crossbar, each of which correspond to a predetermined length section from left and rights ends of the crossbar connected to the front side members, may have a shape which is curved forward or backward based on the front-rear direction of the vehicle body from a remaining intermediate portion of the crossbar to extend to the front side members.

Additionally, an intermediate part which is the remaining intermediate portion may be disposed in a left-right direction of the vehicle body, and inclined parts which are the two parts on the left and right sides of the crossbar may be disposed to be curved from the intermediate part and to extend in an inclined direction of the front side or the rear side of the vehicle body. A first end portion of each of the support brackets may be coupled to the front side member, and a second end portion thereof may be coupled to the curved portion forward or rearward from the remaining intermediate portion of the crossbar.

Further, each of the support brackets may be disposed to extend in an inclined direction opposite a direction of the inclined part of the crossbar among the front side and the rear side of the vehicle body. In each of the support brackets, the first end portion may be installed in a form of a cantilever coupled to the front side member, and the second end portion may be disposed below the curved portion of the crossbar and coupled to support the curved portion of the crossbar from therebelow. Each of the support brackets may have a closed cross-sectional shape.

When the curved portion of the crossbar is disposed above the second end portion of each of the support brackets, the second end portion of each of the support brackets and the curved portion of the crossbar may be engaged by a bolt vertically passing through the second end portion and the curved portion and a nut engaged with the bolt. Further, a reinforcing member may be installed inside the curved portion of the crossbar, and the bolt may be installed to pass through the second end portion of each of the support brackets, the curved portion of the crossbar, and the reinforcing member. A frunk may be installed above the crossbar and the support bracket so that the frunk may be supported on the crossbar and the support bracket which are below the frunk.

The front vehicle body reinforcing structure according to the exemplary embodiments of the present disclosure may further include a crash box coupled to a front end portion of each of the front side members on the left and right sides, a bumper beam disposed to extend in a left-right direction of the vehicle body and coupled to the front end portions of the crash boxes on the left and right sides, and a fender apron upper member having a rear end portion coupled to a dash panel and a front pillar and a front end portion coupled to the front side member and the crash box.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

Figure 1:
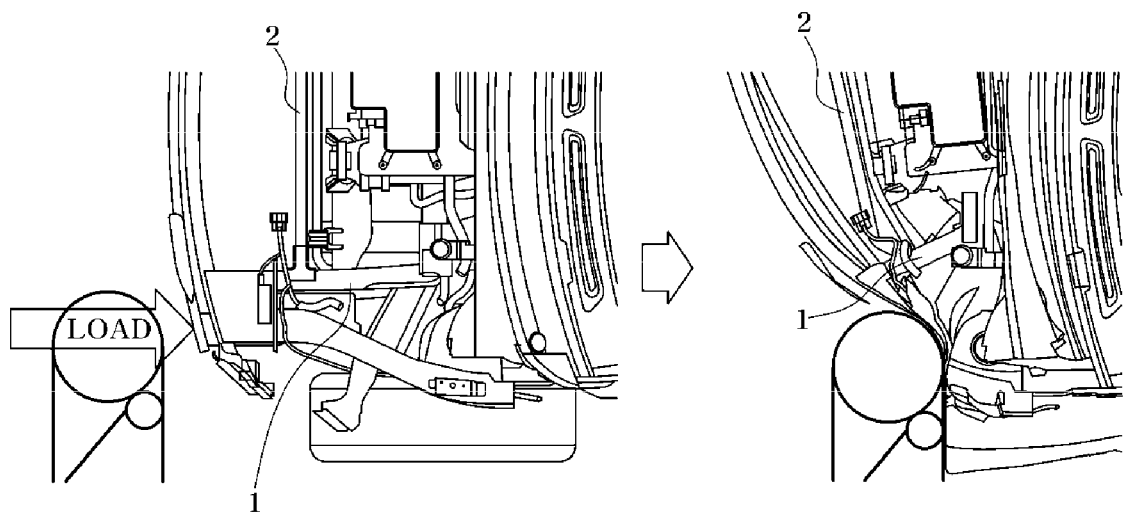
FIG. 1 is a diagram for describing a problem of a front vehicle body structure in which a straight-line shaped crossbar is installed according to the related art.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will be fully described in detail below which is easily practiced by those skilled in the art to which the present disclosure pertains with reference to the accompanying drawings. However, the present disclosure is not limited to the embodiments disclosed herein and may be implemented in other forms.

The present disclosure relates to a front vehicle body reinforcing structure capable of effectively improving front collision response performance of a vehicle. More specifically, the present disclosure may be applied to an electric vehicle and relates to a front vehicle body reinforcing structure capable of being applied to an electric vehicle equipped with a frunk which is a loading space of a front side of a vehicle body. Further, the present disclosure relates to a front vehicle body reinforcing structure capable of inducing an avoidance behavior of a vehicle to reduce passenger injury and damage to a vehicle and a battery in the event of an insurance institute for highway safety (IIHS) small overlap collision in a long-distance electric vehicle.

As the existing small overlap collision response structure, a structure for protecting a passenger compartment (e.g., interior of the vehicle) by excessively reinforcing an inner panel of a front pillar and a side sealing portion may increase injury to a neck and a chest of a passenger. Therefore, a method of installing a frunk crossbar which crosses between two front side members at the front side of the vehicle body on both sides thereof in a lateral direction may be considered. However, when a simplified straight-line shaped frunk crossbar is installed at a right angle between the two front side members on the both sides of the vehicle body, the frunk crossbar may be capable of performing a collision complementation function somewhat. However, the frunk crossbar is still vulnerable in a load direction and to joint rigidity and thus, it may be difficult for the frunk crossbar to exhibit sufficient collision response performance.

FIG. 1 is a diagram of Comparative Example that illustrates an example of a front vehicle body reinforcing structure in which a frunk crossbar is disposed at a substantially right angle with respect to two front side member, particularly, a straight-line shaped frunk crossbar crosses between the two front side members on both sides of a vehicle body. As shown in FIG. 1, when a straight-line shape crossbar 2 is coupled perpendicular to front side members 1, the crossbar 2 is disposed at a right angle with respect to a load direction (e.g., a front-rear direction of the vehicle body) in the event of a forward collision (see a left diagram) and thus, appropriate distribution of load paths may not be achieved (see a right diagram).

In particular, when a load in the front-rear direction is applied to a front vehicle body in the event of a small overlap collision, the crossbar 2 buckles prematurely and thus a load distribution effect is reduced and thus, a target collision response effect may not be achieved. When a larger crossbar which is not optimized is installed between the front side members 1 due to the above reason, a weight of the vehicle body is inevitably increased, causing an increase in production cost due to material costs and degradation in fuel efficiency. Accordingly, the present invention employs a crossbar of a shape capable of maximizing distribution of load paths and a load distribution effect.

Figure 2:
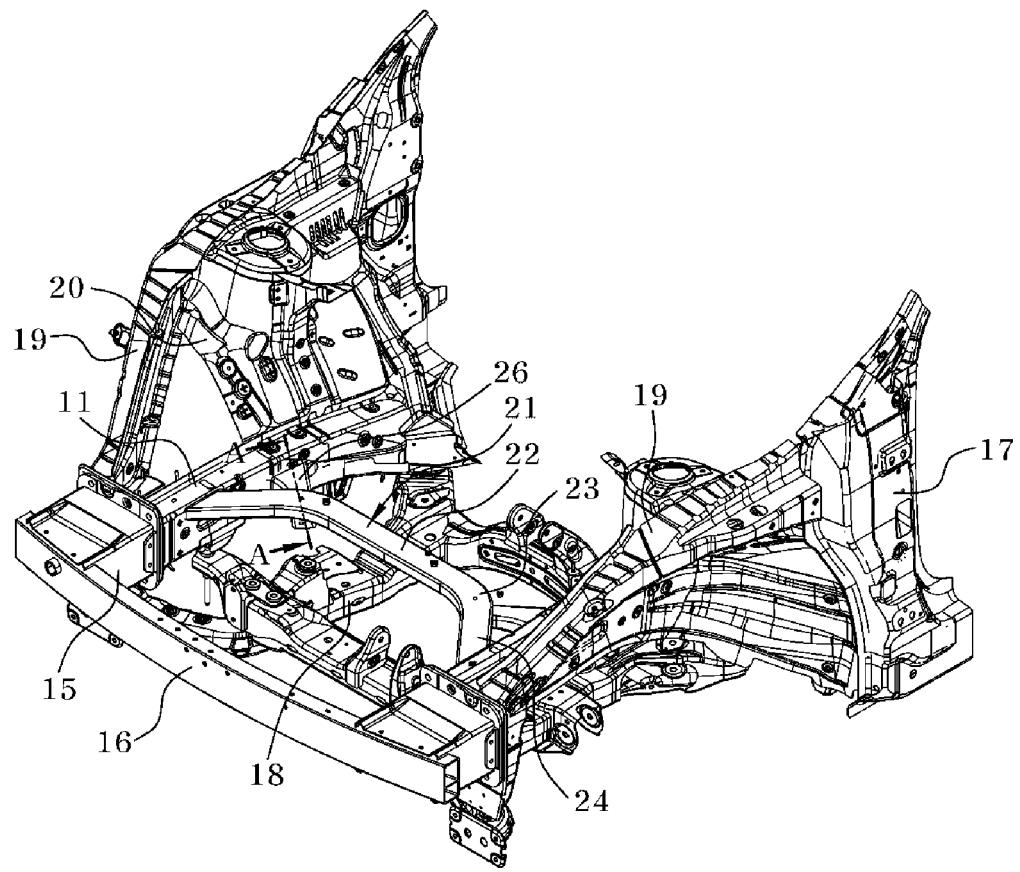
FIG. 2 is a perspective view illustrating a front vehicle body reinforcing structure according to one exemplary embodiment of the present disclosure.
Figure 3:
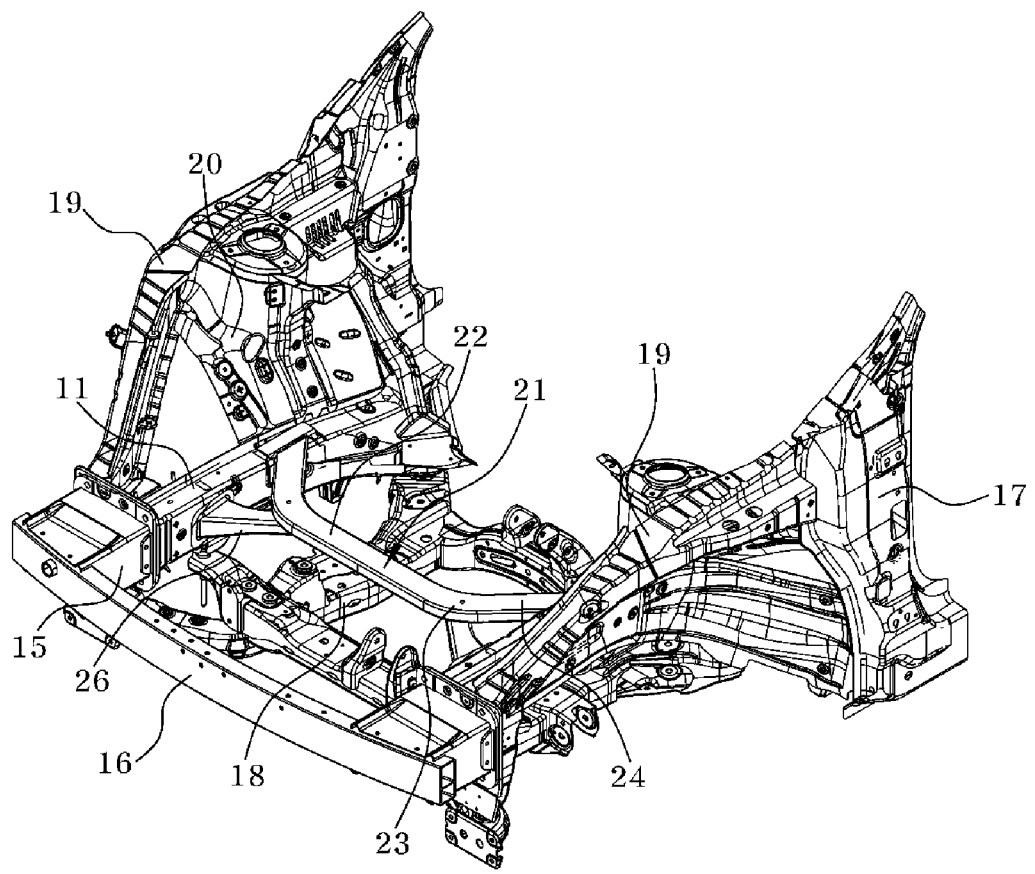
FIG. 3 is a perspective view illustrating a front vehicle body reinforcing structure according to another exemplary embodiment of the present disclosure.

FIG. 2 is a perspective view illustrating a front vehicle body reinforcing structure according to one exemplary embodiment of the present disclosure, and FIG. 3 is a perspective view illustrating a front vehicle body reinforcing structure according to another exemplary embodiment of the present disclosure. The exemplary embodiment of FIG. 2 and the exemplary embodiment of FIG. 3 are not different from each other in components except for a crossbar 21 and a support bracket 26.

In other words, there is only a difference in the crossbar 21 and the support bracket 26 among the components of the front vehicle body reinforcing structure in the vehicle, and there is no difference between the two exemplary embodiments in a front side member 11, a crash box 15, a bumper beam 16, a sub-frame 18, a fender apron upper member 19, and the like. As shown in the drawings, the front side member 11 may be disposed to extend in a front-rear direction of the vehicle body on both left and right sides of a front vehicle body, and a transverse cross section of the front side member 11 may have a closed cross section of a "□" shape, that is, a square shape or rectangular shape.

The front side member 11 on each of the left and right sides may include a front side inner member (indicated by a reference numeral "12" in FIG. 4) disposed on an inner side based on a width direction of the vehicle body (i.e., a left-right lateral direction of the vehicle body), and a front side outer member (indicated by a reference numeral "13" in FIG. 4) disposed on an outer side based on the width direction thereof. The front side inner member 12 and the front side outer member 13 may be coupled to each other to form a closed cross section of a "□" or square shape.

A front end portion of the front side member 11 on each of the left and right sides may be coupled to a front end portion of the sub-frame 18 which forms a lower portion of the vehicle body, and an extension member (not shown) that extends in the width direction of the vehicle body may be installed in the front end portion of the front side member 11. The extension member may also be coupled to the front end portion of the sub-frame 18, and the crash box 15 having a cross section of a "□" or square shape may be coupled to the front end portion of the front side member 11 and the extension member.

Further, an end portion of the bumper beam 16 disposed to extend in the width direction of the vehicle body (e.g., the left-right lateral direction of the vehicle body) may be coupled to a front end portion of the crash box 15 on each of the left and right sides. Accordingly, the bumper beam 16 has an arrangement structure crossing the two crash boxes 15 on the left and right sides at the front end of the vehicle body, and the bumper beam 16 may be supported on the two front side members 11 in a state in which the two crash boxes 15 are interposed between the bumper beam 16 and the two front side members 11.

In addition, a front pillar 17 may be coupled to a dash panel (not shown), each of the fender apron upper members 19 may be coupled to the dash panel and the front pillar 17 on the left and right sides of the vehicle body, and a front end portion of each of the fender apron upper members 19 may be coupled to the extension member of the front side member 11 and the crash box 15. In FIGS. 2 and 3, a reference numeral 20 denotes a connecting bracket installed to connect between the fender apron upper member 19 and the front side member 11.

Meanwhile, the front vehicle body reinforcing structure according to the exemplary embodiment of the present disclosure may include a bow-shaped crossbar 21 disposed to extend lengthwise in the left-right lateral direction of the vehicle body between the two front side members 11 on the left and right sides of the vehicle body. In the front vehicle body reinforcing structure according to the embodiment of the present disclosure, the bow-shaped crossbar 21 may have a bow shape which is bent to a front side or a rear side based on the front-rear direction of the vehicle body and has a shape of bilateral symmetry.

Further, two portions on left and right sides of the crossbar 21, each of which correspond to a predetermined length section from left and rights ends of the crossbar 21 connected to the front side members 11, have a shape which is curved from a remaining intermediate portion of the crossbar 21 in the same direction of either the front side or the rear side of the vehicle body to extend to the front side members. Consequently, an entire shape of the crossbar 21 may have a bow shape bent to the front side or the rear side.

FIG. 2 illustrates an example in which both ends of the crossbar 21 are bent to the front side, and FIG. 3 illustrates another example in which the both ends of the crossbar 21 are bent to the rear side. As shown in the drawings, the crossbar 21 in the exemplary embodiment of the present disclosure may include an intermediate part 22 disposed to extend lengthwise in the width direction of the vehicle body, i.e., in the left-right lateral direction of the vehicle body, and inclined parts 24 curved to the front side or the rear side of the vehicle body from the intermediate part 22 and disposed on left and right sides of the intermediate part 22 to extend lengthwise in an inclined direction of a front side or a rear side of the intermediate part 22.

Particularly, the intermediate part 22 of the crossbar 21 may be disposed lengthwise in a direction perpendicular to the front-rear direction of the vehicle body between the two front side members 11 on the left and right sides of the vehicle body. The portions bent to the front side or the rear side from the intermediate part 22 to extend lengthwise become the inclined parts 24 on the left and right sides of the intermediate part 22, and distal ends of the inclined parts 24 may be fixed to the front side member 11.

Figure 4:
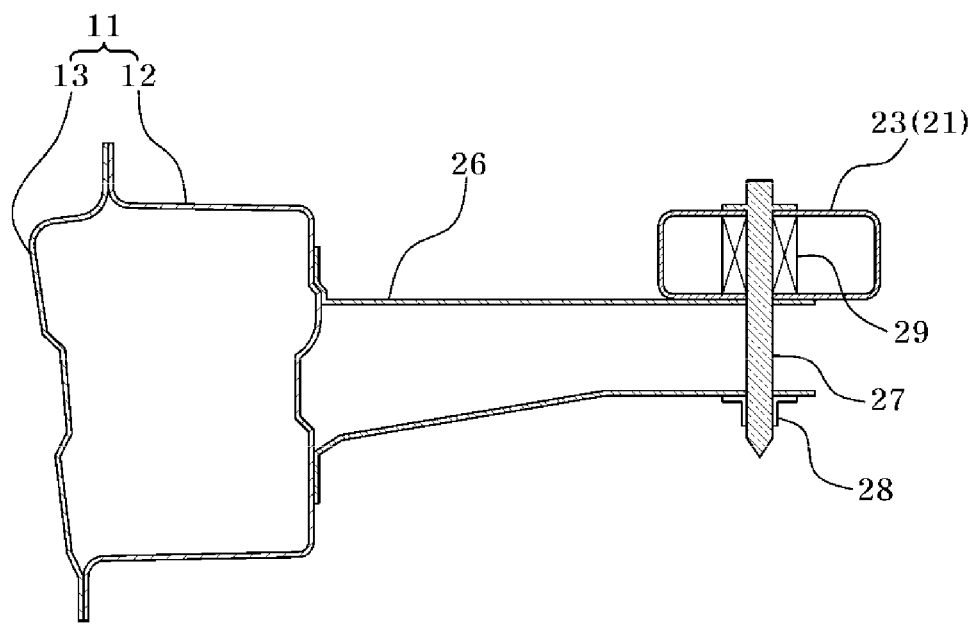
FIG. 4 is a cross-sectional view taken along line A-A of FIG. 2 according to an exemplary embodiment of the present disclosure.

In addition, the front vehicle body reinforcing structure according to the exemplary embodiment of the present disclosure may further include the support bracket 26 installed to connect between each of left and right portions of the crossbar 21 and each of the front side members 11 on the left and right sides of the vehicle body. A first end portion of the support bracket 26 may be installed in the form of a cantilever which is integrally coupled to the front side member 11. FIG. 4 is a cross-sectional view taken along line A-A of FIG. 3 that illustrates that the support bracket 26 is installed in the form of a cantilever.

Referring to FIG. 4, the front side member 11 may include the front side inner member 12 disposed inward and the front side outer member 13 disposed outward. As shown in the drawing, the front side inner member 12 may be coupled to the front side outer member 13 to form the front side member 11 having a closed cross-sectional shape, and a first end portion of the support bracket 26 may be coupled to an inner surface of the front side member 11, more specifically, to an inner surface of the front side inner member 12 through welding or the like.

The support bracket 26 becomes a constituent part in the form of a cantilever in which a first end portion of the support bracket 26 may be coupled to the inner surface of the front side member 11. In particular, a second end portion of the support bracket 26 opposite to the first end portion thereof may be coupled to be disposed below the crossbar 21. In other words, as shown in FIG. 4, the support bracket 26 may be supported such that a curved portion 23 between the intermediate part 22 and the inclined part 24 of the crossbar 21 is put on the second end portion of the support bracket 26. When the curved portion 23 of the crossbar 21 is disposed on the second end portion of the support bracket 26, the curved portion 23 and the support bracket 26 which are vertically stacked may be integrally coupled by a bolt 27 and a nut 28 which pass therethrough. In particular, instead of the bolt 27 and the nut 28, the upper crossbar 21 and the support bracket 26 therebelow may be integrally coupled to each other through welding or the like.

FIG. 4 illustrates that the crossbar 21 may be formed of a member having a quadrangular closed cross-sectional shape, i.e., a pipe having a quadrangular cross section. In addition, referring to FIG. 4, a reinforcing member 29 may be installed in at least a portion of the crossbar 21 coupled to the second end portion of the support bracket 26, that is, inside the curved portion 23 on each of the left and right sides of the crossbar 21. In particular, the bolt 27 may be installed to pass through the reinforcing member 29. The reinforcing member 29 may prevent deformation of the crossbar 21 due to bolt engagement.

As shown in FIGS. 2 and 3, two support brackets 26 may also be installed such that a first of the two support brackets 26 is installed in the curved portion 23 on each of the left and right sides of the crossbar 21 and a second thereof is installed at the front side member 11 on each of the left and right sides of the vehicle body. In particular, the crossbar 21 and also the support bracket 26 may be installed in a symmetrical structure inside the vehicle body. As shown in FIGS. 2 and 3, the inclined parts 24 of the crossbar 21 may be disposed to be obliquely inclined in an outward direction of the front side or the rear side of the vehicle body toward the front side members 11 on the left and right sides of the vehicle body from the intermediate part 22.

Particularly, similar to the inclined part 24 of the crossbar 21, a length direction of the support bracket 26 may also be inclined in the front-rear direction toward an inner side of the vehicle body from the front side member 11. The support bracket 26 on each of the left and right sides of the vehicle body may be disposed to be obliquely inclined in the outward direction of the front side or the rear side of the vehicle body from the crossbar 21 toward the front side member 11.

However, a length direction of the inclined part 24 of the crossbar 21 and the length direction of the support bracket 26 become opposite inclined directions to the front and rear sides of the vehicle body based on the intermediate part 22 of the crossbar 21 which is disposed lengthwise in the left-right lateral direction of the vehicle body. Thus, the inclined part 24 and the support bracket 26 on each of the left and right sides of the vehicle body form an X-shaped reinforcing structure, which supports loads in a vertical direction and the front-rear direction, by interposing the intermediate part 22 between the inclined part 24 and the support bracket 26. Further, coupling portions between the both ends of the crossbar 21 and the front side members 11 on the right and left sides of the vehicle body may be disposed rearward relative to the crash boxes 15 for absorbing collision energy.

Figure 5:
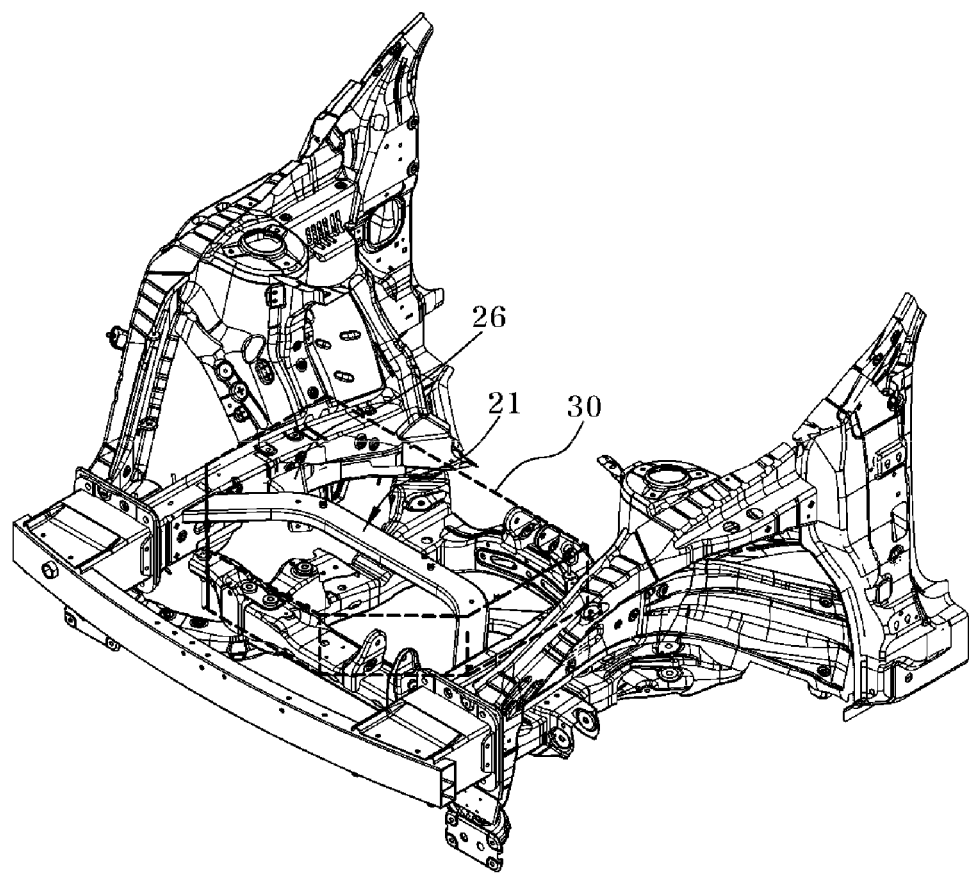
FIG. 5 is a diagram illustrating a position of a frunk in a vehicle in which the front vehicle body reinforcing structure according to an exemplary embodiment of the present disclosure is installed.
Figure 6:
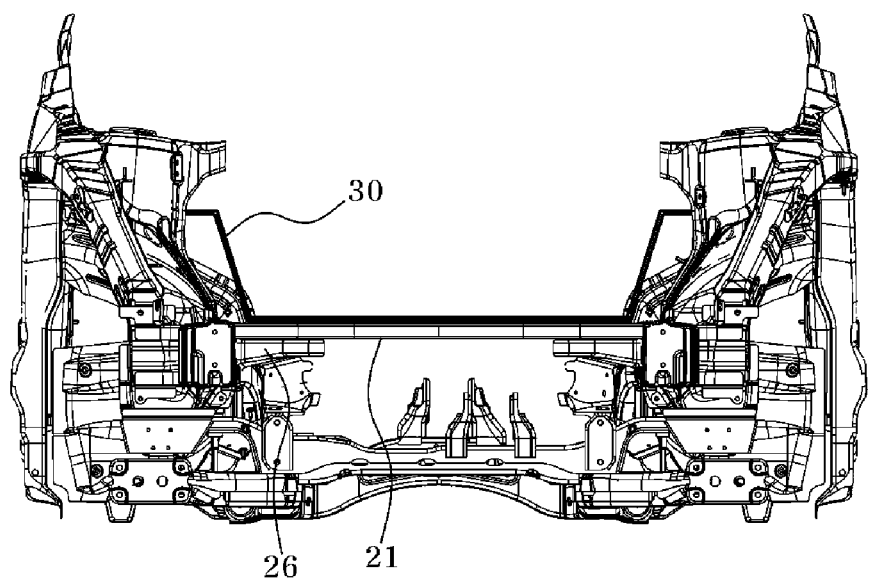
FIG. 6 is a diagram illustrating a state in which the frunk is supported by a bow-shaped crossbar of the front vehicle body reinforcing structure according to an exemplary embodiment of the present disclosure.

Meanwhile, FIG. 5 is a diagram illustrating a position of a frunk in a vehicle to which the front vehicle body reinforcing structure according to the exemplary embodiment of the present disclosure is applied, and FIG. 6 is a diagram illustrating a state in which the frunk is supported by the crossbar of the front vehicle body reinforcing structure according to the present disclosure. As shown in the drawings, a frunk 30 may be disposed above the crossbar 21. In other words, the crossbar 21 may be disposed below the frunk 30 which is the loading space of the front side of the vehicle body and may support the frunk 30 above the crossbar 21 while connecting between the front side members 11 on the both sides of the vehicle body.

Figure 7:
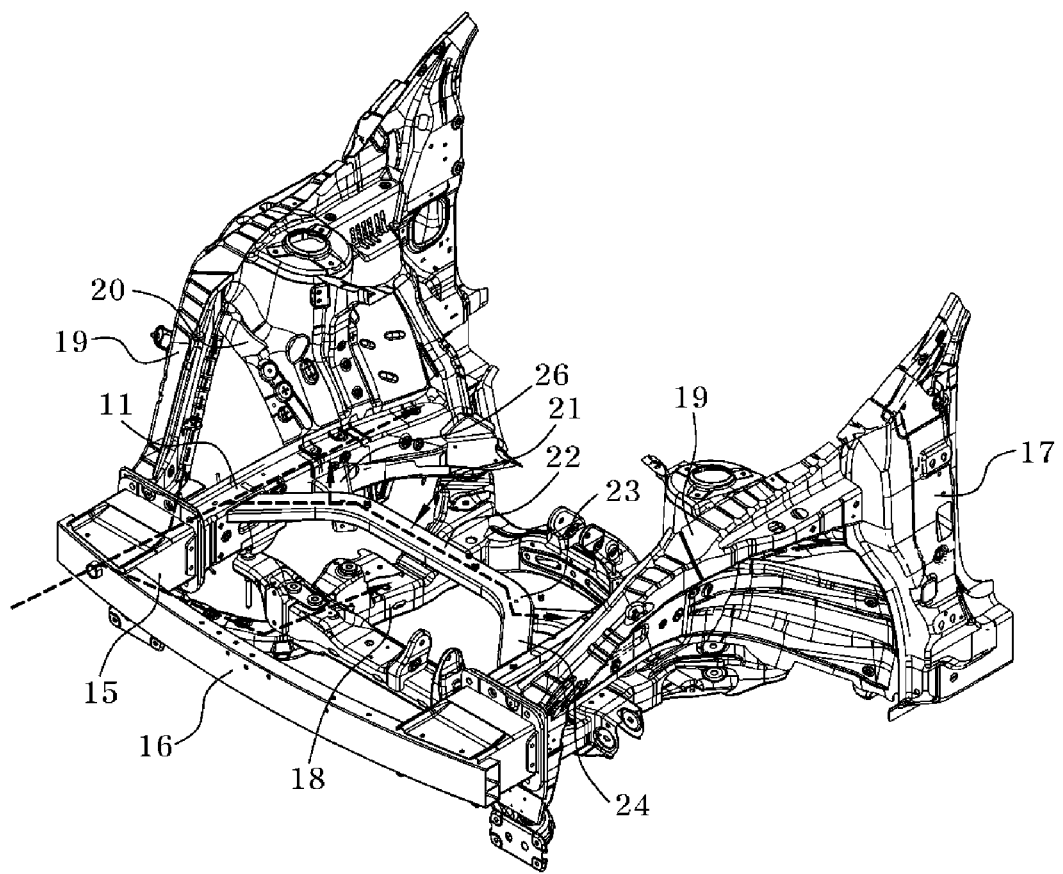
FIG. 7 is a diagram illustrating a state in which distribution of load paths is performed in a vehicle in which the front vehicle body reinforcing structure according to an exemplary embodiment of the present disclosure.

Thus, as shown in FIG. 7, in accordance with the front vehicle body reinforcing structure according to the present disclosure, a load applied during a head-on collision of the vehicle may be transferred from the crash box 15 by being distributed to a plurality of load paths including the front side member 11, the upper side fender apron upper member 19, the crossbar 21, the support bracket 26, and the sub-frame 18 which is a lower portion of the vehicle body.

Further, since the load transferred along the crossbar 21 may be transferred to the surrounding structure including the support bracket 26, the collision energy may be distributed and absorbed to effectively reduce passenger injury. In the case of a small overlap/offset collision, since the transferred load may be transferred to the opposite front side member 11 along the crossbar 21, load distribution may be achieved. Thus, deformation of the passenger room or compartment may be minimized, and a lateral load in the left-right direction may be increased compared with a load in the front-rear direction of the vehicle body so that a lateral behavior of the vehicle may be induced.

In terms of durability and rigidity, since the two front side members 11 on the left and right sides of the vehicle body may be coupled to the crossbar 21 and the support brackets 26 in an X shape, lateral rigidity and torsional rigidity of the vehicle body may be increased. When the crossbar 21 is disposed with a mounting portion of the sub-frame 18 of a front wheel at the same position or a position close to the mounting portion thereof in the front-rear direction, an increase in input point rigidity and durability of the sub-frame 18 may be achieved.

Additionally, the frunk 30 may be disposed above the crossbar 21 which is a reinforcing structure to support the vehicle body and thus, support rigidity of the frunk 30 may be supplemented and durability of the frunk 30 may be increased. In terms of assemblability, a method of directly engaging the crossbar 21 with the support bracket 26 by disposed the crossbar 21 thereon is applied and thus, the number of engagement points of the crossbar 21 may be minimized and an engagement work may be facilitated.

As described above, in accordance with a front vehicle body reinforcing structure according to the present disclosure, front collision response performance of a vehicle may be effectively improved, front collision response performance of an electric vehicle having a frunk may be improved, and, in the event of a small overlap collision in a long-distance electric vehicle, it may be possible to induce vehicle avoidance behavior to reduce passenger injury and damage to the vehicle and a battery.

Although the exemplary embodiments of the present disclosure have been described in detail, the scope of the prevent disclosure is not limited to these exemplary embodiments, and various modifications and improvements devised by those skilled in the art using the fundamental concept of the present disclosure, which is defined by the appended claims, further fall within the scope of the present disclosure.

What is claimed is:

1. A front vehicle body reinforcing structure, comprising:
   a front side member disposed on each of left and right sides of a front vehicle body to extend in a front-rear direction of a vehicle body;
   a crossbar installed to connect between the front side members on the left and right sides and having a form bent in a bow shape; and
   support brackets installed to connect between left and right side portions of the crossbar and the front side members to support the crossbar at each of the front side members.

2. The front vehicle body reinforcing structure of claim 1, wherein the crossbar has a closed cross-sectional shape.

3. The front vehicle body reinforcing structure of claim 2, wherein each of the support brackets has a closed cross-sectional shape.

4. The front vehicle body reinforcing structure of claim 1, wherein the crossbar has a shape which is bent forward or backward based on the front-rear direction of the vehicle body.

5. The front vehicle body reinforcing structure of claim 1, wherein two portions on left and right sides of the crossbar, each of which correspond to a predetermined length section from left and rights ends of the crossbar connected to the front side members, have a shape which is curved forward or backward based on the front-rear direction of the vehicle body from a remaining intermediate portion of the crossbar to extend to the front side members.

6. The front vehicle body reinforcing structure of claim 5, wherein:
   an intermediate part which is the remaining intermediate portion is disposed in a left-right direction of the vehicle body; and
   inclined parts which are the two parts on the left and right sides of the crossbar are disposed to be curved from the intermediate part and to extend in an inclined direction of the front side or the rear side of the vehicle body.

7. The front vehicle body reinforcing structure of claim 5, wherein a first end portion of each of the support brackets is coupled to the front side member, and a second end portion thereof is coupled to the curved portion forward or rearward from the remaining intermediate portion of the crossbar.

8. The front vehicle body reinforcing structure of claim 7, wherein each of the support brackets is disposed to extend in an inclined direction opposite a direction of the inclined part of the crossbar among the front side and the rear side of the vehicle body.

9. The front vehicle body reinforcing structure of claim 7, wherein, in each of the support brackets, the first end portion is installed in a form of a cantilever coupled to the front side member, and the second end portion is disposed below the curved portion of the crossbar and coupled to support the curved portion of the crossbar from therebelow.

10. The front vehicle body reinforcing structure of claim 9, wherein each of the support brackets has a closed cross-sectional shape.

11. The front vehicle body reinforcing structure of claim 10, wherein, when the curved portion of the crossbar is disposed above the second end portion of each of the support brackets, the second end portion of each of the support brackets and the curved portion of the crossbar are engaged by a bolt vertically passing through the second end portion and the curved portion and a nut engaged with the bolt.

12. The front vehicle body reinforcing structure of claim 11, wherein a reinforcing member is installed inside the curved portion of the crossbar, and the bolt is installed to pass through the second end portion of each of the support brackets, the curved portion of the crossbar, and the reinforcing member.

13. The front vehicle body reinforcing structure of claim 1, wherein a frunk is installed above the crossbar and the support bracket to support the frunk on the crossbar and the support bracket which are disposed below the frunk.

14. The front vehicle body reinforcing structure of claim 1, further comprising:
   a crash box coupled to a front end portion of each of the front side members on the left and right sides thereof;

a bumper beam disposed to extend in a left-right direction of the vehicle body and coupled to the front end portions of the crash boxes on the left and right sides; and a fender apron upper member having a rear end portion coupled to a dash panel and a front pillar and a front end portion coupled to the front side member and the crash box.

\* \* \* \* \*